US011589185B2

(12) United States Patent
Hynds et al.

(10) Patent No.: US 11,589,185 B2
(45) Date of Patent: Feb. 21, 2023

(54) METHOD AND SYSTEM TOOL FOR PLAYBACK OF CONTENT ON A MOBILE DEVICE USING LOCATION DATA

(71) Applicants: David Hynds, Orlando, FL (US); Alex Hynds, Orlando, FL (US)

(72) Inventors: David Hynds, Orlando, FL (US); Alex Hynds, Orlando, FL (US)

(*) Notice: Subject to any disclaimer, the term of this patent is extended or adjusted under 35 U.S.C. 154(b) by 0 days.

(21) Appl. No.: 17/066,891

(22) Filed: Oct. 9, 2020

(65) Prior Publication Data

US 2021/0112367 A1    Apr. 15, 2021

Related U.S. Application Data

(60) Provisional application No. 62/973,570, filed on Oct. 11, 2019.

(51) Int. Cl.
*H04W 4/021*  (2018.01)
*H04L 65/61*  (2022.01)

(52) U.S. Cl.
CPC ............ *H04W 4/021* (2013.01); *H04L 65/61* (2022.05)

(58) Field of Classification Search
CPC ........................ H04W 4/021; H04L 65/4069
USPC .................. 455/456.3, 456.1–456.6
See application file for complete search history.

(56) References Cited

U.S. PATENT DOCUMENTS

| | | | | |
|---|---|---|---|---|
| 5,802,492 | A * | 9/1998 | DeLorme | G01C 21/3476 340/995.23 |
| 10,497,022 | B2 * | 12/2019 | Carlson | G06Q 30/0261 |
| 11,100,114 | B1 * | 8/2021 | Liu | G06F 16/24578 |
| 11,282,109 | B2 * | 3/2022 | Golden | G06Q 30/0261 |
| 11,373,209 | B2 * | 6/2022 | Harlan | G06Q 30/0247 |
| 2002/0107027 | A1 * | 8/2002 | O'Neil | H04W 4/029 455/456.3 |
| 2011/0281538 | A1 * | 11/2011 | Morrison | H04H 60/46 455/185.1 |
| 2012/0058775 | A1 * | 3/2012 | Dupray | G01S 5/0257 455/456.1 |
| 2015/0018015 | A1 * | 1/2015 | Clark | H04W 4/21 455/456.3 |
| 2015/0038173 | A1 * | 2/2015 | Jackson | H04W 4/025 455/456.3 |
| 2015/0088423 | A1 * | 3/2015 | Tuukkanen | G01C 21/3697 701/538 |
| 2015/0141059 | A1 * | 5/2015 | Clark | H04W 4/023 455/456.3 |
| 2015/0186497 | A1 * | 7/2015 | Patton | G06F 16/27 707/740 |
| 2015/0281329 | A1 * | 10/2015 | Dimov | H04L 67/1097 709/217 |
| 2015/0371270 | A1 * | 12/2015 | McDevitt | H04W 4/023 705/14.58 |
| 2016/0057572 | A1 * | 2/2016 | Bojorquez Alfaro | H04W 4/12 455/411 |
| 2016/0255477 | A1 * | 9/2016 | Parulski | H04L 67/306 455/456.3 |
| 2017/0164159 | A1 * | 6/2017 | Mycek | H04W 4/21 |
| 2018/0137204 | A1 * | 5/2018 | Zhang | G06Q 30/00 |
| 2018/0310123 | A1 * | 10/2018 | Deluca | H04L 67/22 |
| 2021/0095986 | A1 * | 4/2021 | Brown | G01C 21/3423 |

\* cited by examiner

*Primary Examiner* — Mong-Thuy T Tran

(57) ABSTRACT

Method and system tool for playback of content on a mobile device using location data, or composing complex content in real-time on a mobile device utilizing user settings and programming, using device location data as a primary input.

29 Claims, 18 Drawing Sheets

High Level Function

High Level Function

Execute Place Action

Fetch New Content

Continue Content Playback

Real-Time Musical Composition

⟨ Journeys                Edit

City Drive
Created by Me

Starting Action: None

INCLUDED PLACES

Chinatown
Radius: 250 Meters

Fisherman's Wharf
Radius: 250 Meters

Home
Radius: 50 Meters

Junior's
Radius: 70 Meters

Little Italy
Radius: 190 Meters

Meemaw 's House
Radius: 250 Meters

Muir Woods
Radius: 750 Meters

Anthony's Pizza
Radius: 80 Meters

Benjamin's
Radius: 50 Meters

[ By Place Order | Alphabetical ]

METHOD AND SYSTEM TOOL FOR PLAYBACK OF CONTENT ON A MOBILE DEVICE USING LOCATION DATA

RELATED APPLICATIONS

This application claims priority to U.S. Provisional Patent Application No. 62/973,570, filed on Oct. 11, 2019, which is incorporated herein by reference in its entirety, including any addendums, appendixes, and attachments thereto, to the extent this application does not conflict with the present disclosure herein.

BACKGROUND OF THE INVENTION

Playback of music and other audio content through a mobile device is traditionally controlled directly by the user. Selections of which content to play at any given time during device operation are actively chosen by the user, except in the case of functionality such as playing the next selection in a predefined sequential playlist, playing a shuffled, or random selection from a predefined sequential playlist, or playing content locally that is arriving via wireless or other means of data transmission from a third party streaming service.

Additionally, mobile devices utilize location data for various software functions based on multiple hardware sensors and software algorithms embedded within the device operating system and based on location content provided by the system vendor or third parties.

Therefore, a need exists for a novel tool ("the tool") to link playing media files, of any type, with location information for an enhanced user experience. Example combinations could be a child riding to school, an athlete using music as motivation when encountering challenges along a geographic route, a commuter wanting to experience a particular media file as he merges onto a highway, or even enhancing the romantic atmosphere of a date with media changing while approaching a restaurant.

BRIEF SUMMARY OF THE INVENTION

The present invention is directed towards a tool ("tool") for merging the concepts of content playlists and geographic location into a single embodiment. The present invention comprises a programmable application ("app") using the app software in combination with the mobile device and mobile device operating software (OS) for automatic content triggers based on waypoints and location, as well as other app software defined parameters such as time of day, day of the week, round trip status to a waypoint, weather data, or similar parameters, thus executing delivery of content as desired by the user.

BRIEF DESCRIPTION OF THE DRAWINGS

The present invention is illustrated by way of example, and not by way of limitation, in the figures of the accompanying drawings.

While aspects of the present invention will be described with reference to the details of the embodiments of the invention shown in the drawings (and some embodiments not shown in the drawings), these details are not intended to limit the scope of the invention.

FIG. 11. (SS5) shows an embodiment of the tool with a defined Journey, detailing the Places included.

FIG. 14. (SS8) shows an embodiment of the tool details available for a Journey Starting Action.

DETAILED DESCRIPTION OF THE INVENTION

Figure 1:
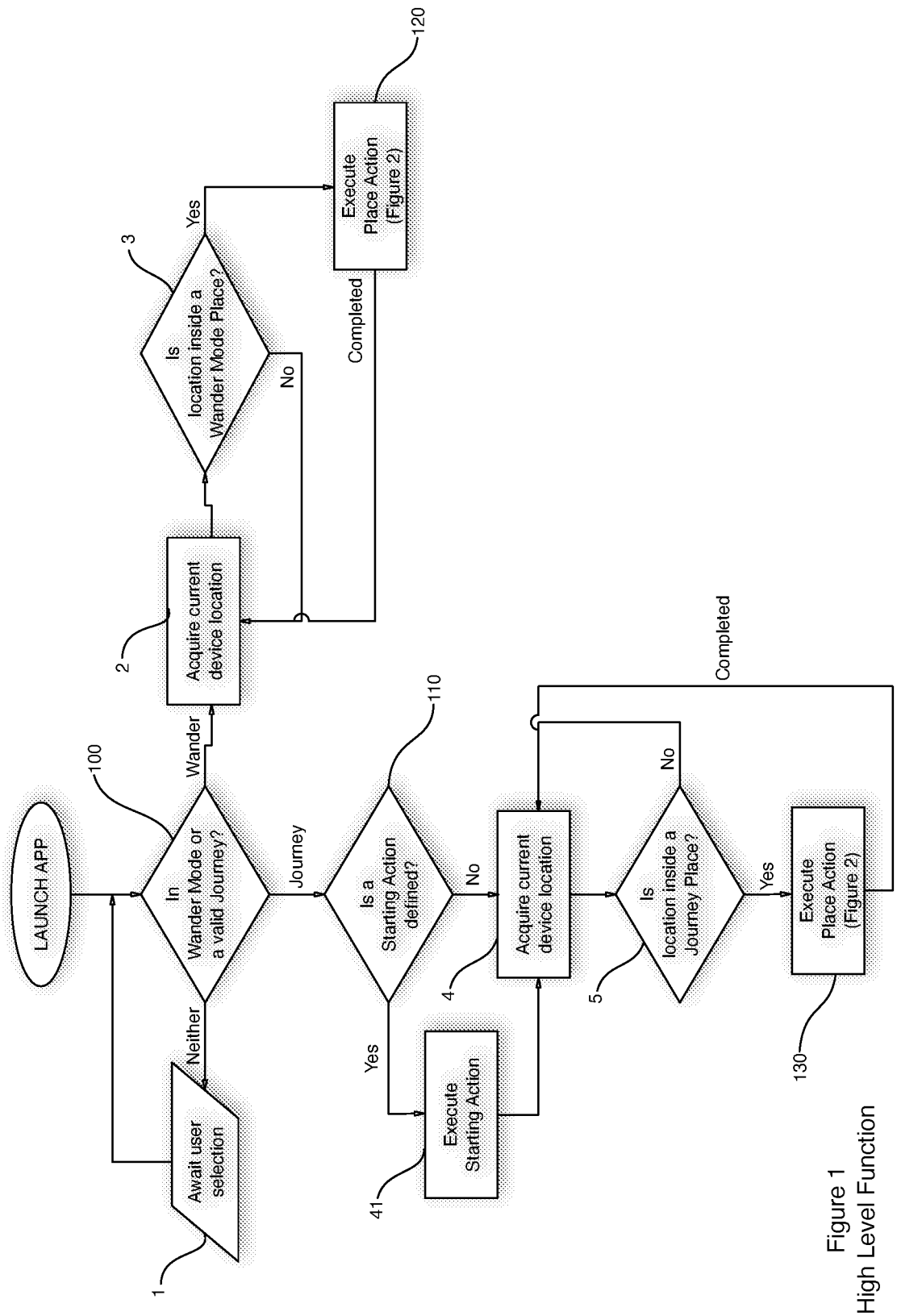
FIG. 1. shows an embodiment of the tool flowchart illustrating the high level functionality upon launching the software.

The following description is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, also called versions, but the invention is not limited to any embodiment or version. The scope of the invention is limited only by the claims and the invention encompasses numerous alternatives, modifications and equivalents. Several specific details are set forth in the following description to provide a thorough understanding of the invention. These details are provided for the purpose of example and the invention may be practiced according to the claims without some or all of these specific details. In general, the order of the steps of disclosed processes may be altered within the scope of the invention. A component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A tool (app tool, app software, app tool software are all used interchangeably herein to disclose the embodiments of the tool) is disclosed using software and location data for playback of content on a mobile device. A mobile device is a handheld tablet or other device that is made for portability, such as but not limited to a phone, and is therefore both compact and lightweight. Improvements to data storage, processing and display technologies allow these small devices to do nearly anything that had previously been traditionally done with larger personal computers. Mobile devices are also known as handheld computers.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

For the purposes of promoting an understanding of the principles of the present invention, reference will now be made to the embodiments illustrated in the drawings and specific language will be used to describe the same, only as examples and not intended to be limiting.

In some embodiments of the present invention a graphical interface (GUI) is presented for the user to generate waypoints for geographical locations of their choosing, referred to as Places 5, 3, 200, based on the meaning of that location to the user, whether it be of personal significance such as a home or work location, school, relative's home, or similar, or whether it be of locational significance such as a specific area that is differentiated from surrounding areas, a neighborhood or other defined region, or whether to be of public significance such as a landmark or publicly known location like a park or a beach.

In some embodiments of the present invention the further capability is provided using the graphical interface for the user to collect waypoints that have been defined into groupings, known as Journeys 100, 110, to be selected and executed as a single data structure. The concept of a Journey allows the user, through the application (app) software, to experience an otherwise novel content experience, of their own definition, where specific content is played within specific geographic locations. This provides the user with an immersive content experience connecting current surroundings to the content available through the mobile device. Content comprises audio, video, podcasts, audio books, pictures, or any other form of communication medium. The invention comprises automatic content triggers based on waypoints and location, as well as based on other software defined states such as time of day, day of the week, round trip status to a waypoint, weather data, or similar states, thus executing playback of content.

Figure 2:
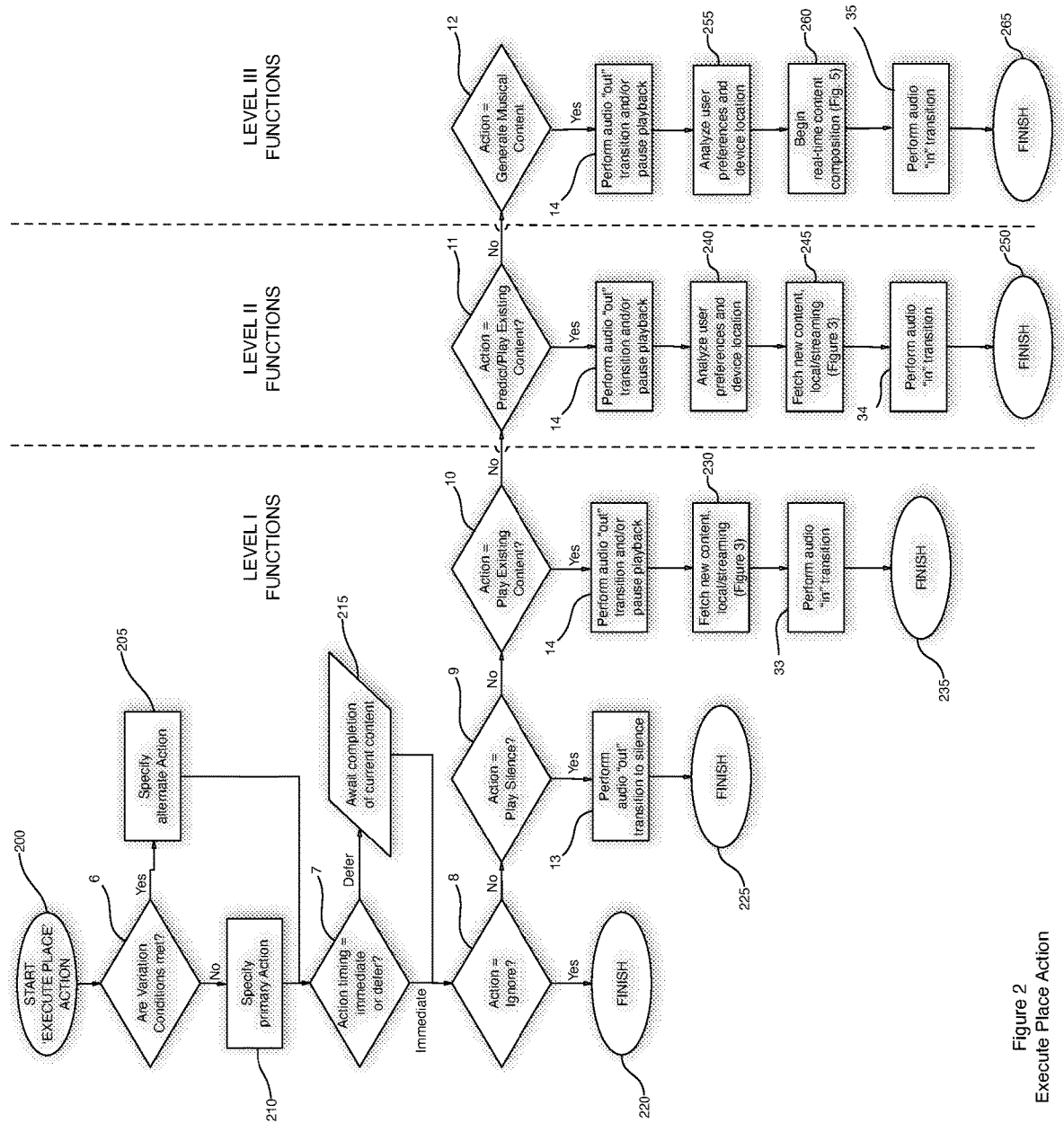
FIG. 2. shows an embodiment of the tool flowchart describing the functions involved when an Action is requested.
Figure 3:
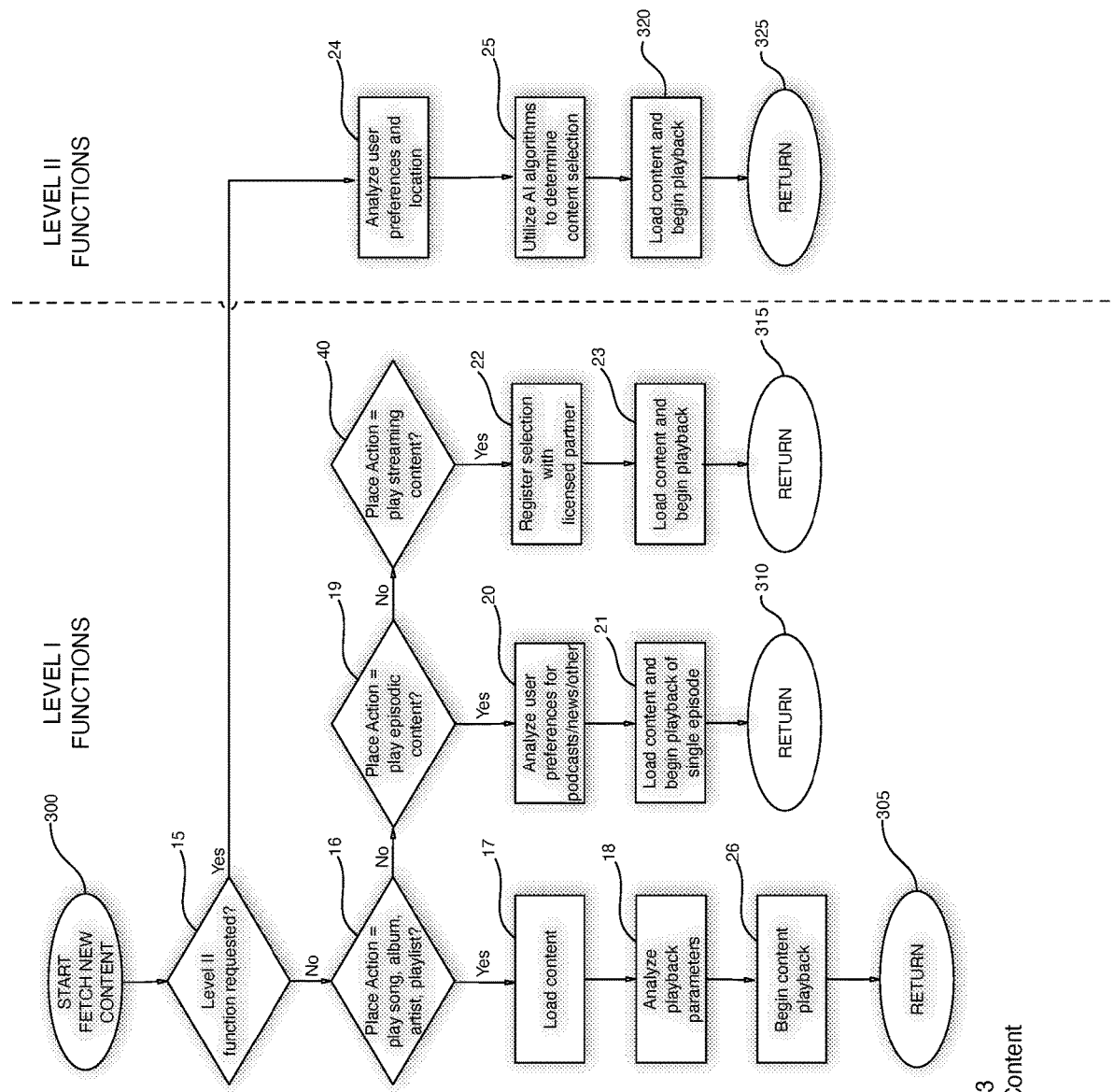
FIG. 3. shows an embodiment of the tool flowchart illustrating the functionality implemented when fetching new content and the related processes executed.

In some embodiments of the present invention primary object, referred to herein as Level I FIG. 2, FIG. 3 functionality, comprising a method for programming an app and implementing the playback of previously purchased individual content or content otherwise licensed by the user on the subject device based on location, time of day, day of the week, weather, or other input parameters. Location 2 data can be provided by the mobile device using methods including, but not limited to, global positioning system data, bluetooth beacons or other wireless positioning methods.

In some embodiments of the present invention a secondary object, referred to herein as Level II FIG. 2, FIG. 3 functionality, comprising a method for predicting and playing previously purchased individual content or content otherwise licensed by the user on the subject device, based on location parameters. Examples could include, but are not limited to, playing content evocative of a beach as the user device approaches the beach, rainy day music driven by weather data, content appropriate for an evening mood due to the time of day, movie soundtracks when near a theatre, etc.

In some embodiments of the present invention another object, referred to herein as Level III 12, 500 functionality, comprising a method for generating and performing complex content selections in real-time based on parameters previously selected by the user.

The embodiments of the present invention may be utilized individually, concurrently, or in any sequential combination.

The order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Specific typical examples of the hardware/software are as follows, not intended to be limiting: processor(s) are suitable chips such as those manufactured by Intel, AMD, IBM, AT&T, ARM v7 64-bit, etc. The chips may be 32 bit, 64 bit or any other type processor suitable for this application. Suitable software code and/or computer code/instructions used for practicing the invention may be—iOS: Swift, Objective-C, C, C++—Android: Java, C++, JavaScript, for example, or programmed in any language that can install to a mobile device and access data from the device. The device needs GPS (or similar location sensing system and/or technology) and sufficient data storage for the amount of data desired by any of the embodiments disclosed herein. The hardware can be made by any manufacturer whose specifications are compatible to the hardware/software requirements disclosed above as examples, not intended to be limiting.

In some embodiments the app software is launched by the user (FIG. 1) in one of two ways: through standard touch actions as presented through the mobile device operating system, or through voice commands as facilitated by the mobile device operating system (OS).

The initial state of the app software is determined by saved user preferences that control whether the app software launches in Wander Mode 100 or within a predefined and valid Journey 100. If neither are present, the app software awaits additional user input in block 1 to determine the state and proceed (see FIG. 6).

"Wander Mode" 100, 3 is herein defined as a large, nonspecific Journey that can be configured by the user to include all Places defined, or any subset thereof. The intent is to have a configuration that allows for specific path or endpoint in mind, such as general driving or traveling.

If Wander Mode is in effect upon launch or becomes in effect through user activity, in block 2 the mobile device location is assessed as the primary input to the app software engine. This location is determined solely through the use of sensors provided as a part of the mobile device hardware and its operating system (OS). As referenced in block 3, if the current location is within the edge boundaries previously defined for a Place by the user, the appropriate Place Action is called. Wander Mode can be configured by the user to include all Places previously defined or some subset of the Places defined. The use case for Wander Mode is when a specific travel route and Place order is not anticipated.

Likewise, if a valid Journey is in effect upon launch or becomes in effect through user actions, in block 4 the mobile device location is assessed as the primary input to the app software engine. This location is determined solely through the use of sensors provided as a part of the mobile device hardware and OS software. As referenced in block 5, if the current location is within the edge boundaries previously defined for a Place by the user, the appropriate Place Action is called. "Journeys" are hereby defined as collections of Places previously defined by the user.

In some embodiments the processes for initially defining the data structures for Places, Variations, Place Actions, and Journeys are described in subsequent detail within this document.

In some embodiments execution of a primary Place Action (FIG. 2) or of a Variation Action 6, 205 is determined by location. The primary Place Action 210 is programmed or defined by the User through the graphical user interface (GUI) presented by the app software. This is the default Action executed when a valid location is recognized by the app software, absent any Variations.

In some embodiments a Variation triggers an alternate Action for a Place that will take priority over the Primary Action and be executed by the app software if one of more predefined parameters are met (block 6). A single Place can have no Variations, a single Variation, or many Variations, in addition to its default Primary Action. The predefined parameters that may be used individually or in conjunction with one another in any given Variation include, but are not limited to, time of day, weather, day of the week, round trip return to a Place, or the Journey that is being executed, for example.

In some embodiments the user can select whether a primary Place Action or Variation Place Action is to occur immediately or be deferred 7 until the currently playing content is complete. In block 7 the app software will wait, if appropriate, before commencing Action execution.

In some embodiments, actions, for example, not intended to be limiting, can take five basic forms: ignore 8, play silence 9, play existing content 10, predict and play existing content 11, or generate musical content 12.

The ignore form in block 8 is used simply as a placeholder for the user when defining a Place. It does nothing, but allows for a Place to be fully defined otherwise in terms of location, name, and sequence.

The play silence form in block 9 provides complete silence, useful for providing a desired buffer between Places or to allow for content to cease playing when the user approaches an area where quiet is desired.

The play existing content form in block 10 is the most common form for a typical user, where music, episodic content, a radio channel, or the like are played.

The predict and play existing content form in block 11 is similar to block 10, with the fundamental difference being that the user has opted for this Action to allow the app software to intelligently analyze the location and select previously licensed content based on publicly known metadata for that location. Examples of this could be, but are not limited to, proximity to a historic government building causing the tool to select patriotic music, a public facility such as a beach playing content appropriate for that area, an event underway such as a baseball game playing baseball themed selections, and the like. The selection parameters, appropriate to the content type but described with music herein, to be used and their relative weighting are determined during Place programming by the user and include, but are not limited to, genre of music, words within the title or artist of the music, or prominent lyrics within the music.

In some embodiments the generate musical content form in block 12 has the fundamental difference from the others in that it will generate media content in real-time within the device based on numerous weighted parameters selected by the user at the time of the app programming the Action. The parameters used by the app generation algorithms are described with more detail subsequently in this document as well as being described in FIG. 5.

In some embodiments each of the Action forms with the exception of the ignore form can be programmed by the app user to transition from the content previously being played, if any, through multiple types of audio "out" transitions in blocks 13 and 14: fade down, bump (instant), or sound. Fade down will slowly lower the volume of the content being played until it is no longer audible and pause playback. Bump will not alter the volume, but will simply pause existing playback. Sound transitions will allow the user to select a transition sound provided by the app software to play on top of currently playing content and continue playing until an appropriate time after playback has begun for the new content.

In some embodiments upon completion of the audio "out" transition, the software will fetch new content 300 (FIG. 3). This step is valid for Level I and Level II functionality. The decision for Level I or Level II is made in block 15.

If the Place Action involves playing a song, album, artist, playlist or other forms of existing musical content per block 16, new content will be loaded in block 17 based on app parameters programmed by the user during the initial setup of a Place. The proper content Uniform Resource Locator, or URL, will be identified and referenced by the app software for use by the embedded playback routines presented by the mobile device OS. Playback parameters will then be analyzed in block 18 and set for audio playback to begin. Refer to the app Data Structure Definition subsection below for detailed parameters used.

If the Place Action involves playing back episodic content (block 19) such as a podcast, news program, audio book, or related content, the parameters previously set by the user will be evaluated in block 20 to determine which content to play. Refer to the app Data Structure Definition subsection below for detailed parameters referenced here. Once the proper content is determined, the app software will reference the proper asset URL and begin playback in block 21.

In some embodiments the Place Action may also involve playing back streaming content licensed by business partners. This is evaluated in block 40. If this content is programmed to be played by the user, then that selection is registered through the internet with the business partner via third party software as being selected in block 22. Once the proper content is identified, the app software will reference the proper internet URL in block 23 and begin playback. Examples of this type of content could include, but not be limited to, live music from a local business that is occurring as the mobile device enters the area, songs selected by a child's school as they approach to reinforce the lessons for them from that day, real estate information for a specific listing being delivered based on the user selecting a Journey that has been provided by a realtor for that area, or information regarding a landmark or area.

In some embodiments, in block 15, if Level II functionality is requested through user app programming for a Place Action, the app software will analyze the associated details and user preferences in block 24 and pass the results to block 25 where AI (Artificial Intelligence) algorithms are utilized to determine the proper content selections for playback. The content to be played must be available in the user's third party licensed library, and will be matched for playback based on publicly available metadata about the Place location or based on the name chosen by the User for the Place. The parameters used by the app software will include, but not be limited to, the song title, album title, music genre, artist, or by matching key words or phrases within the song lyrics with the location metadata, for example.

Figure 5:
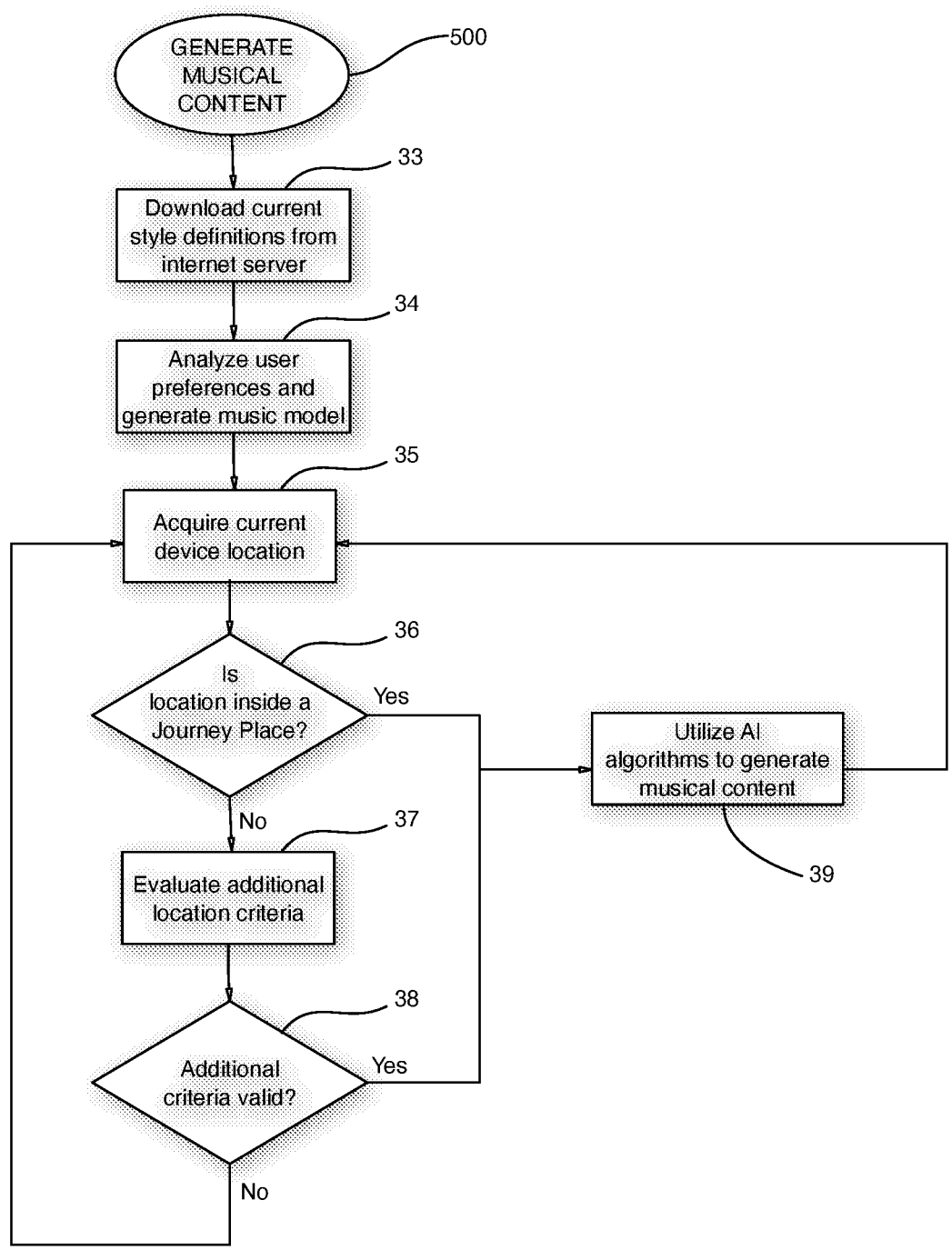
FIG. 5. shows an embodiment of the tool flowchart illustrating the real-time generation of musical content by the tool as a part of the composition function.

In some embodiments after new content has been fetched and played as described in FIG. 3 or is being generated as described in FIG. 5, blocks 33, 34, and 35 from FIG. 2 will then perform an audio "in" transition, programmed by the user through multiple types: fade in, bump in (instant), or sound. These function identically to the audio "out" functions described previously.

Figure 4:
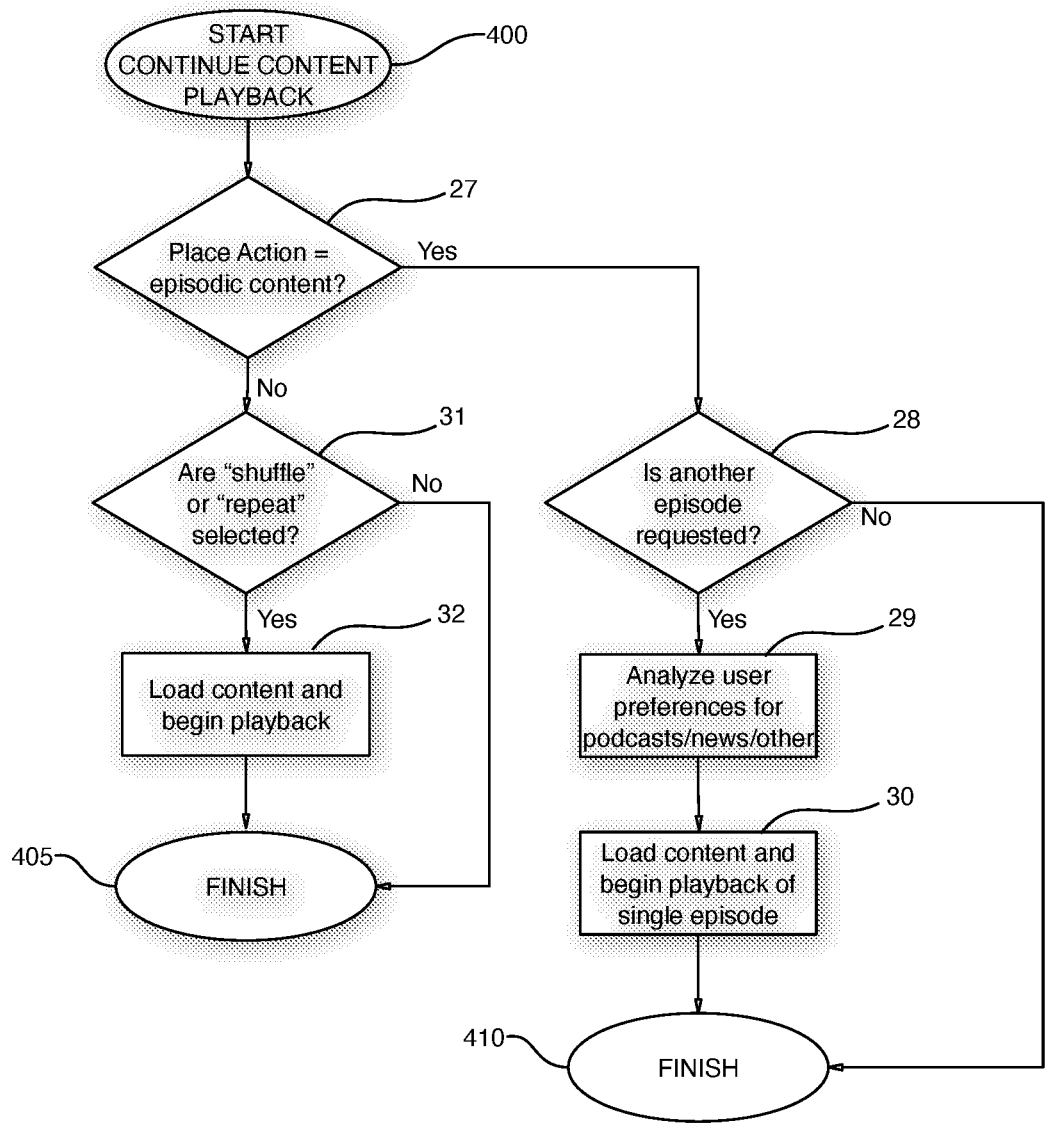
FIG. 4. shows an embodiment of the tool flowchart describing app software operation when continuing playback after completion of specific content.

If a new Place has not been encountered to interrupt and replace the content, upon full completion of the current content being played through commands in blocks 21, 23, 25, or 26, the app software will execute the functionality of FIG. 4.

In block 27, the software determines whether the Place Action involves playing episodic content. If so, block 28 is executed to evaluate whether another episode is requested. If additional episodes are requested, user preferences are analyzed in block 29 to determine the next episode to be played: same podcast or program, different podcast or program, play in sequential order, resume where the episode was left in progress, etc. Once the proper content is determined, the app software will reference the proper asset URL and begin playback in block 30.

In block 27, if the app software determines that the Place Action does not involve episodic content, block 31 is executed to determine whether "shuffle" or "repeat" functions provided by the operating system (OS) are selected for this Place Action. Once the proper content is determined, the app software will reference the proper asset URL and begin playback in block 32.

In some embodiments the Action functionality described above will repeat while the app software is running, either in the foreground on the mobile device, or in the background, until user actions intervene or until another Place location is encountered that is programmed to change the mobile device state parameters.

During operation the app software allows for the user to pause or resume location updates via the graphical user interface or via voice commands as implemented by the device OS. Any playback that is already underway will continue while location updates are paused, however the app software will cease to perform logic location evaluation. As such, the app software will not execute any new Place Actions. This can be useful to enhance battery longevity or to skip known locations as desired and allow current content playback to continue uninterrupted.

Figure 6:
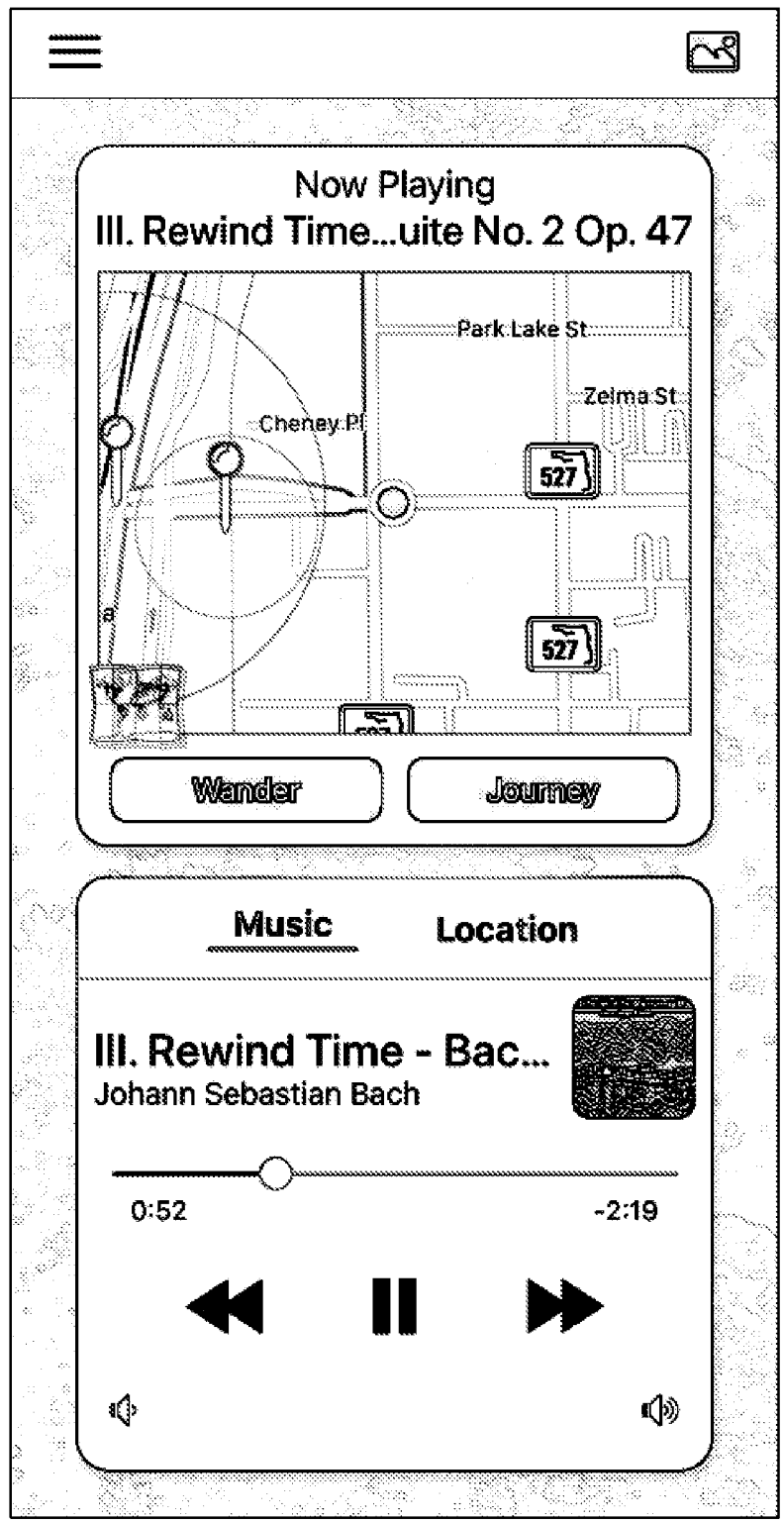
FIG. 6. (SS1) shows an embodiment of the tool Home Page in Wander Mode.
Figure 7:
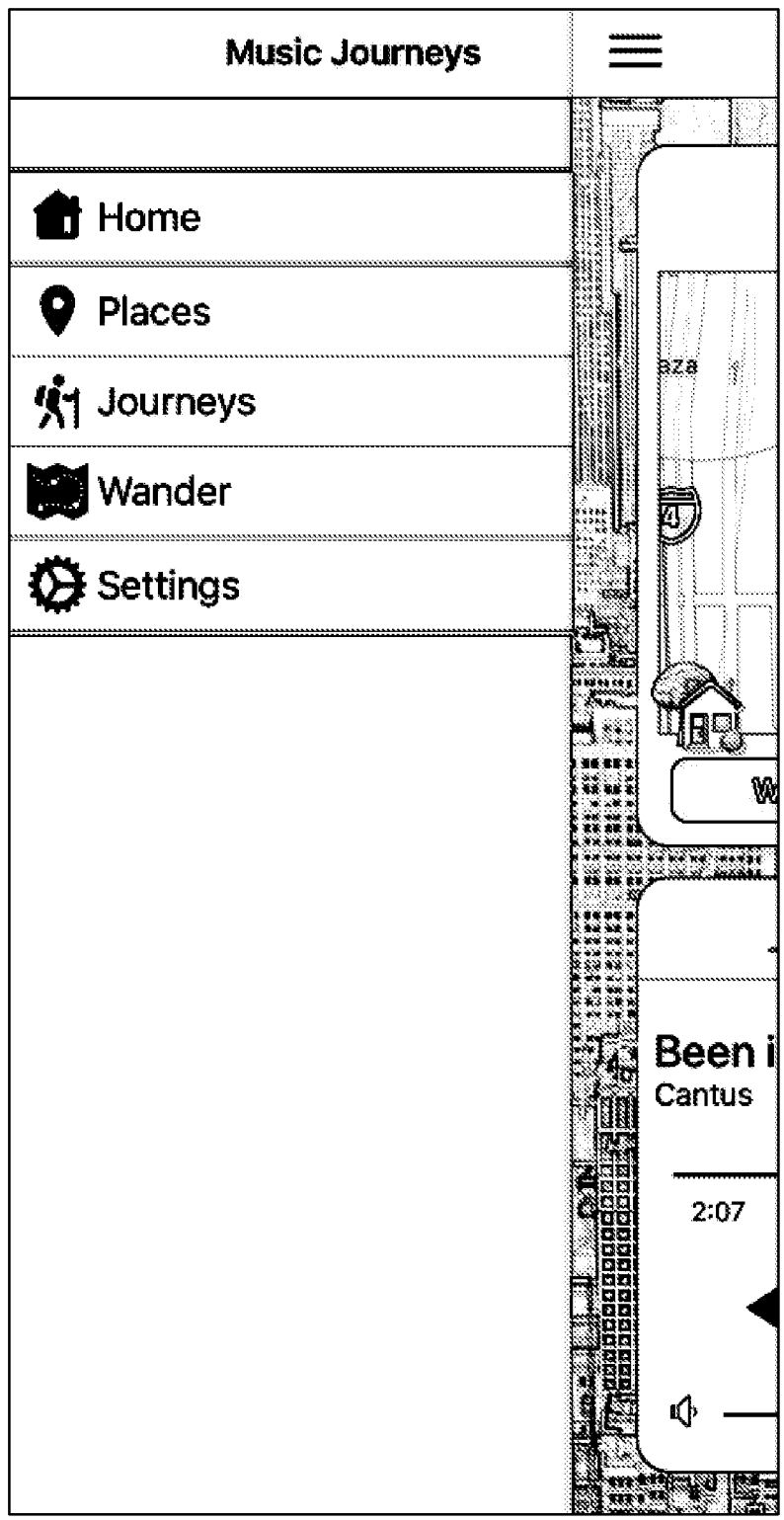
FIG. 7. (SS2) shows an embodiment of the tool main menu choices.

In some embodiments the graphical user interface (GUI) presents functionality to the user during operation including, but not limited to: a map display, audio transport controls, menu choices for different screen selections, changeable background images both static or moving, information on Journey being executed as well as audio content being played, and Place details (see FIG. 6).

The map display presents the current device location relative to traditional map data as presented by the device operating system (OS), as well as displaying edge outlines for nearby Places as defined within the Journey currently executing or Wander Mode, as appropriate. The map display also allows the user to select a Place for editing.

In some embodiments traditional audio transport controls for play, pause, skip forward, and skip backward are implemented within the graphical user interface. Journey transport controls are also implemented to skip the next defined Place Action, to execute the next defined Place Action prematurely if desired by the user, or to allow selection of a completely different Journey. The app software also allows for voice input to perform these three functions while the tool is operating.

In some embodiments settings are presented through menu choices to allow the user to customize various aspects of the app software user interface such as: background image motion or image selection, map display details, app software sound effects, and default view settings (see FIG. 7, 15, 16, 17, 18). Additional settings are presented to adjust performance for battery usage and adjust behaviors such as audio fade times.

Figure 16:
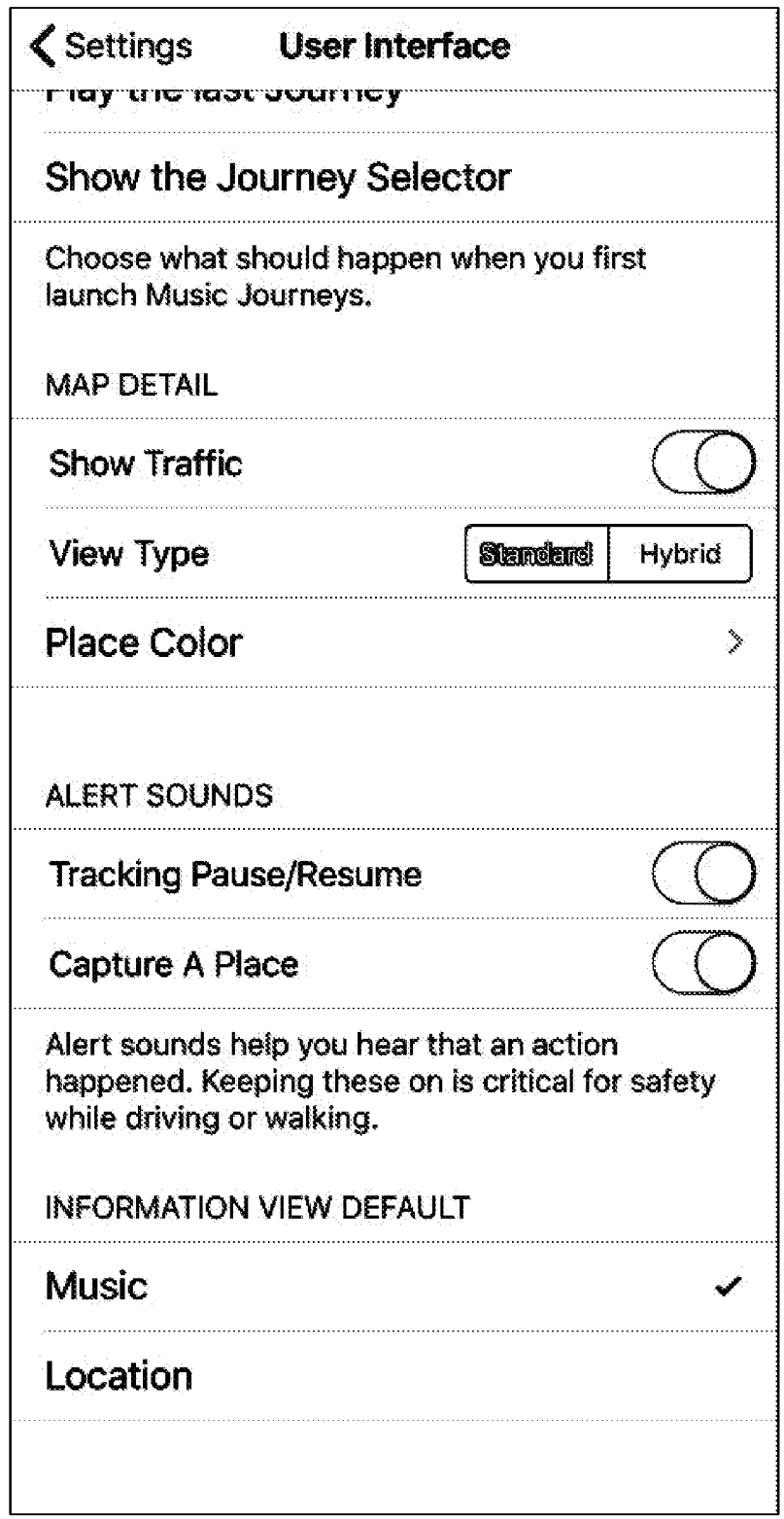
FIG. 16. (SS9B) shows an embodiment of the tool (lower screen portion) of the user interface options in the Settings Page.
Figure 17:
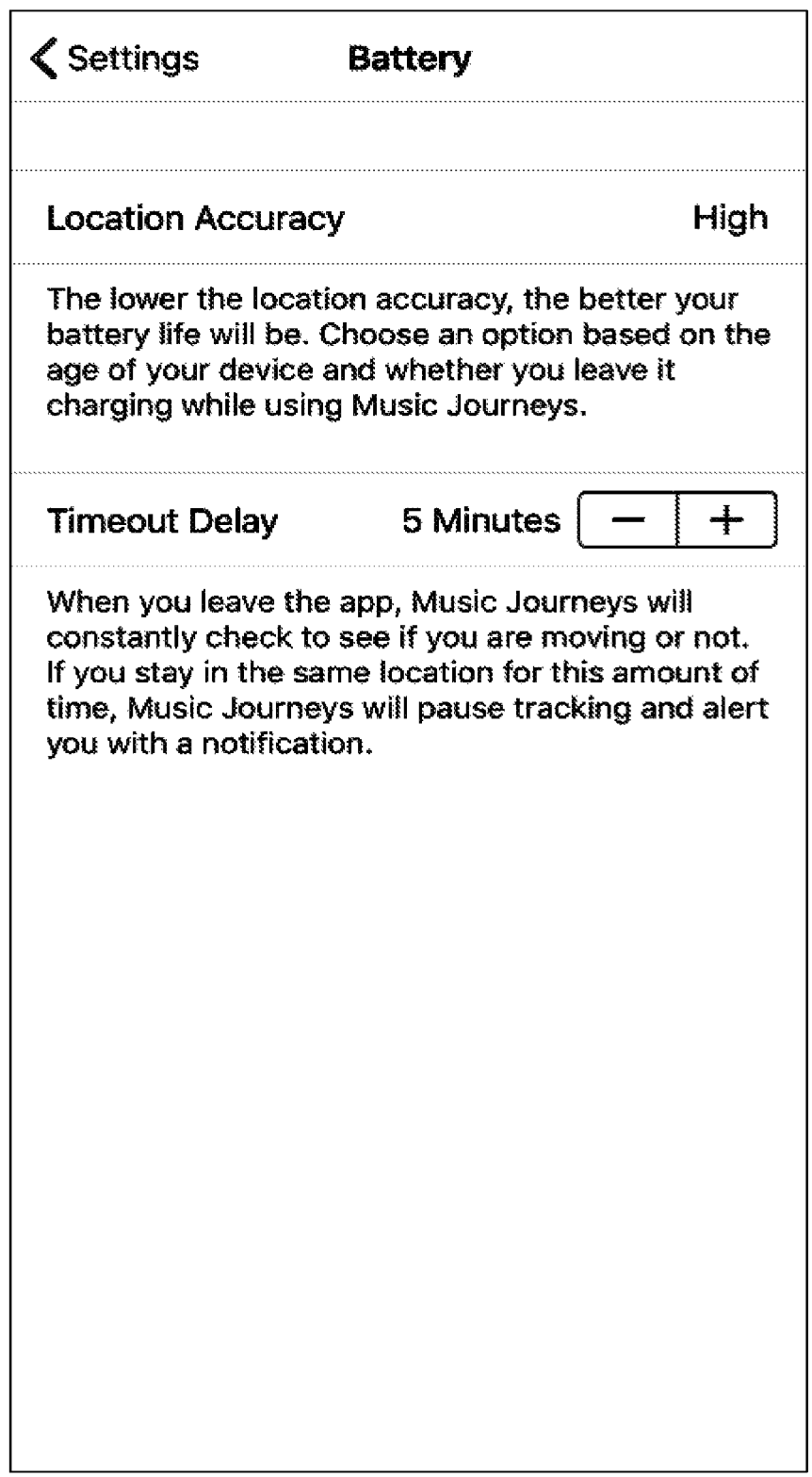
FIG. 17. (SS10) shows an embodiment of the tool of the battery related options in the Setting Page.
Figure 18:
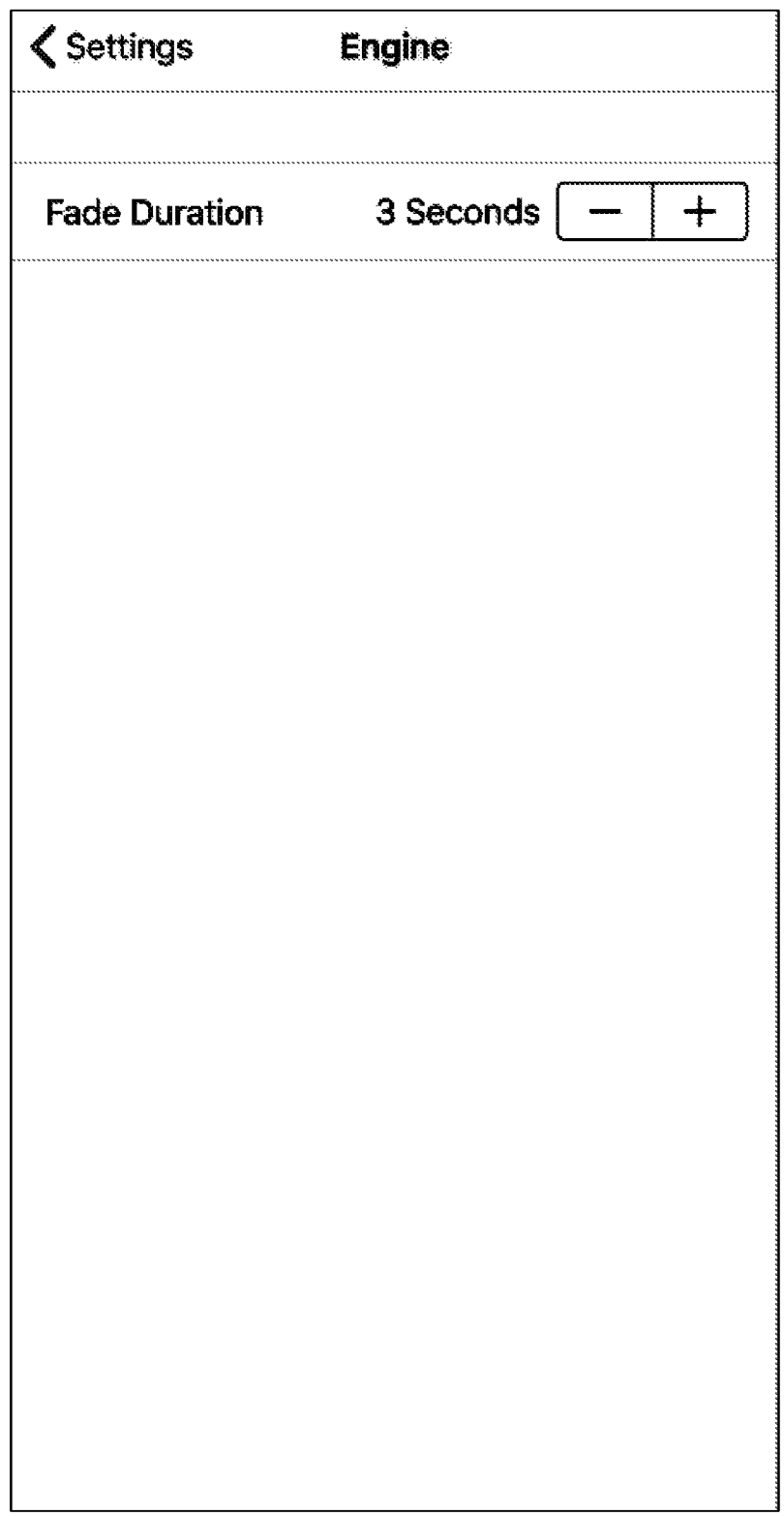
FIG. 18. (SS11) shows an embodiment of the tool option available for transition durations in the Settings Page.

In some embodiments the app software includes audible indicators of certain user Actions in addition to visual and haptic (tactile feedback) confirmation of touch activity, to allow for more complete confirmation when the user is focusing on their travels instead of the device. These are selectable through the app software settings (see FIG. 16).

In some embodiments during app software operation, location updates and Place Actions are allowed to occur both when the app software is functioning in the foreground within the mobile device powering system, as well as in the background, such as when other apps are running, or when the mobile device display is off.

In some embodiments the app software is capable of interfacing with the device operating system (OS) to allow for voice controlled functionality even prior to its launch or when the app is operating in the background. The functionality available includes, but is not limited to, functionality to launch/pause a Journey or wander mode, pause/resume the use of location updates during operation, or terminate app software execution.

In some embodiments the app software is capable of real-time composition to generate media content, referred to as Level III functionality (FIG. 5). This process utilizes user-defined proportional parameters to guide artificial intelligence algorithms for creating musical content in real-time through the mobile device.

In some embodiments real-time composition is begun in block 33 by loading predefined style parameters from an internet-based server (sometimes referred to as "the cloud") that is directly related to and wholly a part of this invention. These styles will have been previously compiled and coded through server side data analytics of existing media content. The styles are requested by the app software and downloaded to the mobile device.

In block 34, user preferences are proportionally analyzed to determine how to utilize the style parameters These parameters included, but are not limited to, genre, composer, artist, performer, orchestration, tempo, and dynamics. The results of this analysis are combined with the style parameters to generate an app software model in preparation for aural musical composition and playback.

The mobile device location is assessed in block 35. This location is determined solely through the use of sensors provided as a part of the mobile device hardware and operating system (OS). As referenced in block 36, if the current location is within the edge boundaries previously defined parameters for a Place by the user, this data is passed to block 39 for execution. If the current location is not inside these defined edge boundaries, additional parameters are evaluated in block 37. These parameters include, but are not limited to, time of day, weather, speed, direction of travel, and additional map location data provided by the host operating system. If these additional parameters are valid for the styles defined parameters being referenced, this data is passed to block 39.

Block 39 provides the collection point for the music model as shown in block 34 and the location and additional parameters from blocks 36 and 37. This functionality generates the content in real-time through the audio system of the host mobile device.

This analysis and musical content generation will continue until a valid Place changes or silences its playback.

In some embodiments additional functionality within the graphic user interface includes, for example, the ability to customize the user interface including preprogrammed as well as user uploaded screen backgrounds that may have motion behind the primary user interface; ability for user to alter the display aspects of the navigational user interface; interact with voice control for Journey triggering or Wander Mode while the app tool is not currently running; display all pertinent details of the content being played including, as appropriate, artist, composer, album, playlist, play time, album art, podcast episode, news program, radio channel, etc.; provide the ability for a moving background image behind the home page displays and controls, including artwork provided by the app tool as well as the ability for the user to upload their own background image of preference; popup information on content being played including, as appropriate, artist, composer, album, playlist, play time, album art, podcast episode, news program, radio channel, etc.; ability for the user to like/dislike content and have those preferences transmitted to the content providing service that is serving the content.

Utilizing the graphical user interface presented by the app software through the device operating system, the user must first create Places and Place Actions per their preference. The User can assign Places and their associated Actions to Wander Mode or compile Places and their Place Actions into one or more Journeys. This section describes processes and details associated with defining the parameters of each of these data structures stored by the app software.

Figure 8:
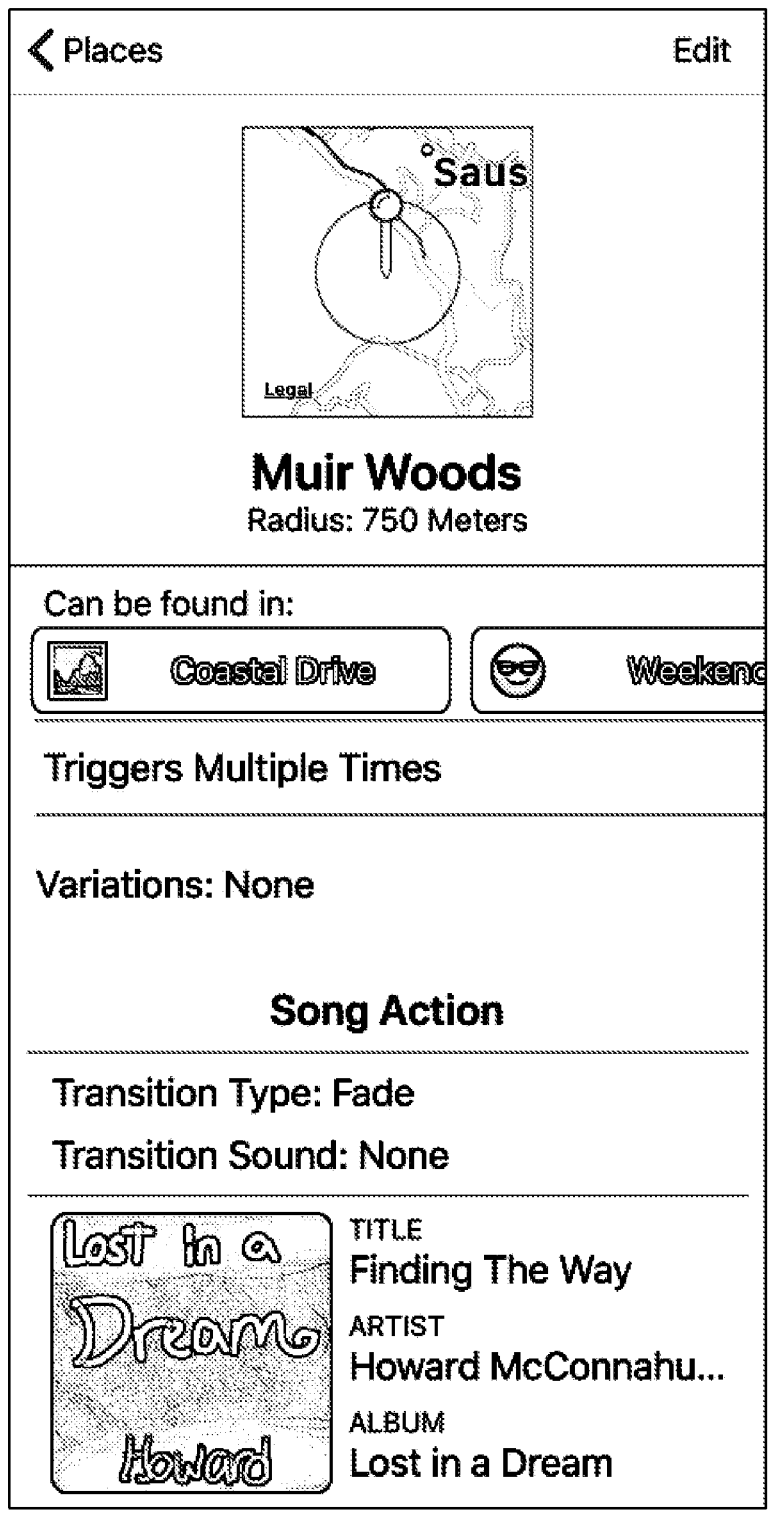
FIG. 8. (SS3) shows an embodiment of the tool Place details for an example previously defined by a user.
Figure 9:
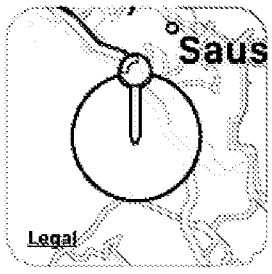
FIG. 9. (SS4A) shows an embodiment of the tool (upper screen portion) of the edit screen choices for a defined Place.

Places parameters are defined by the user, functioning as the basis for all other activity in Levels I, II, and III. A primary method of defining a Place can be done manually regardless of current mobile device location. The user selects a unique name for each Place, followed by the selection of the shape (any shape desired), edge parameters, and size (any size) of the Place including: circular, elliptical, rectangular, user-defined polygonal shape, or a specific roadway, sidewalk, railway, subway, watercraft path, or trail (see FIG. 8, 9).

Figure 10:
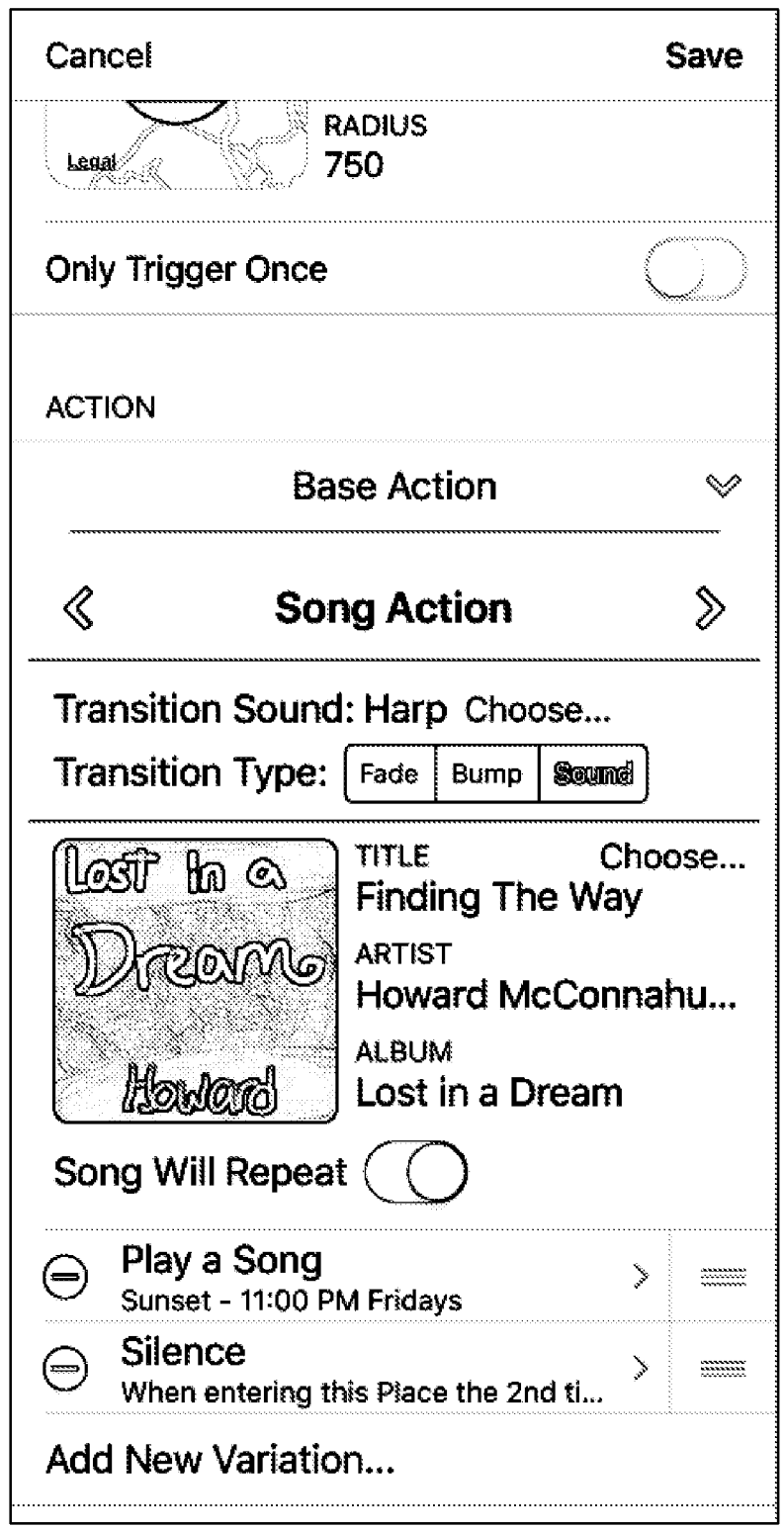
FIG. 10. (SS4B) shows an embodiment of the tool (lower screen portion) of the edit screen choices for a defined Place.

In addition to Place naming and geographical definition, the app tool software allows the user to select which Place Action is to be executed upon entering the Place, as described above. After selection of the Place Action, the app software presents an appropriate set of default parameters for the chosen Action to the user for adjustment. These parameters can be described in three separate categories: timing parameters, transition parameters, and content parameters (see FIG. 10).

In some embodiments selection of timing parameters allow the Place Action to occur either immediately upon entering a Place or defer the Action until full completion the content currently being played. Adjustment of an additional timing parameter will allow for the new content to be started at a specific time offset within its data. An example use would be to begin playback of a song not at its beginning, but one minute and two seconds into its duration at a favorite musical passage.

In some embodiments transition parameters enable various methods of audio volume changes, timing, and sound effects to be coupled with the change in content. The transition types include volume fade down, volume fade up, bump (immediate change in content with no decreasing/increasing volume), volume crossfade (overlapping content where the volume of the original content fades down simultaneously with the volume for the replacement content fading up), or volume duck (volume for the original content decreases a predefined amount, new content is played over the original content, and upon completion of the new content the volume for the original content increases to its original state). All audio fade durations and volume levels are selectable through the graphical user interface. An additional type of transition is the ability to select an audio countdown to overlap the primary content prior to entering a Place, based on user selectable parameters. One example of this would be a verbal countdown for joggers/runners, prior to entering a Place, that serves as a preprogrammed milestone on their route. Another example would allow content streamed by a localized business entity to be temporarily overlaid on the ducked (an audio production term, meaning lowered volume) content related to a Place that has recently been entered.

In some embodiments sound effects for use in transitions are primarily sourced directly from the compiled app software, however the app software also provides the ability for the user to record, produce, and save their own sound effects for use in this capacity.

Content parameters selectable for non-episodic content include song, album, artist, genre, or playlist, as well as selectable playback details such as repeat song, repeat all, shuffle, and play a single random song from a playlist. Content parameters can also include playback of streaming content from a third party service, such as radio channels or other content channels, for example.

For episodic content, the parameters presented include next episode in a podcast or program, random episode, continue previously played episode, continue with next episode vs. stop after a single episode, play episode from podcast A, then move to next episode from podcast B, etc.

All parameters as described above are saved in the app's software core data structure to be recalled and executed by the app software when appropriate, based on location and other conditions.

In some embodiments an alternate method for defining a Place is to enter Journey Capture Mode, and begin traveling on a planned route. During motion, the app software allows for the user to touch a large area of the device screen and capture that location in latitude and longitude. This location is loaded into a new Place and assigned a generic name, allowing the user to edit each of the new defined Places and add the remaining details such as Place Action after Capture Mode is exited. This alternate method allows for generation of multiple Places in one session.

Figure 13:
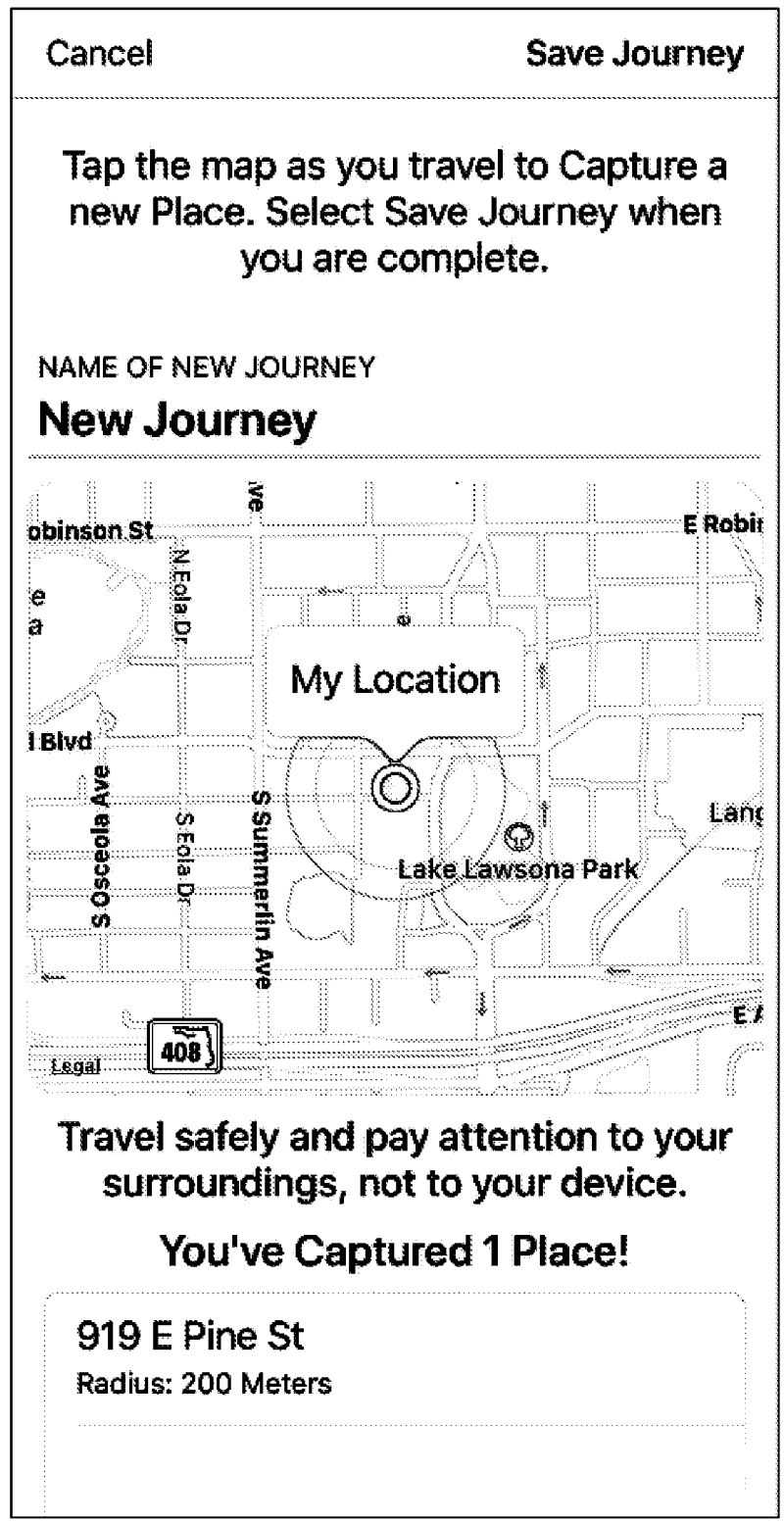
FIG. 13. (SS7) shows an embodiment of the tool Place Capture mechanism, where locations can be captured during travels and saved to a new Journey.
Figure 15:
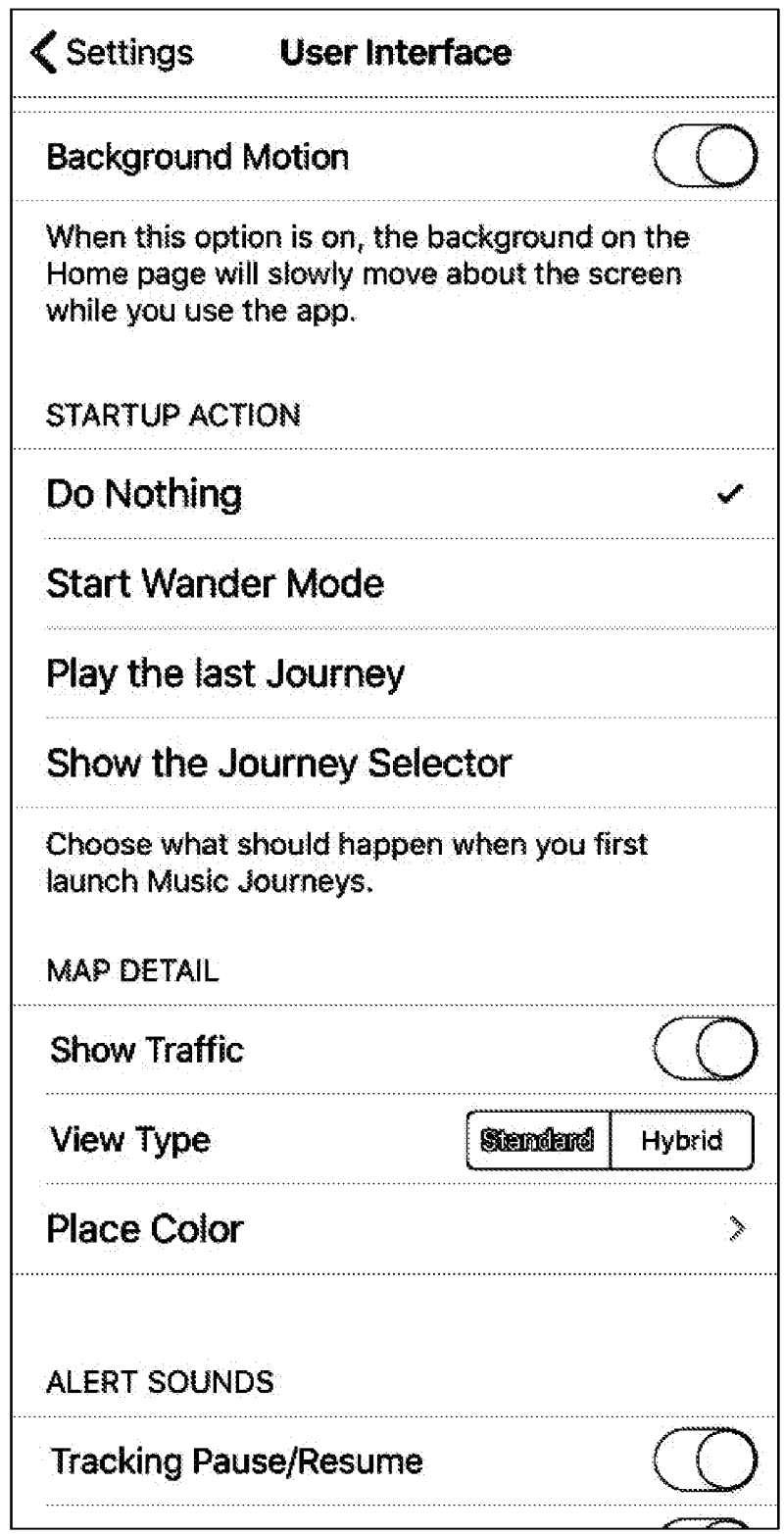
FIG. 15. (SS9A) shows an embodiment of the tool (upper screen portion) of the user interface options in the Settings Page.

In some embodiments a second alternate method for defining a Place called Map Mode, is similar to Capture Mode, but does not require the user and mobile device to be traveling. The user enters this mode and manually manipulates a map interface to the desired location, and captures a new Place in latitude and longitude. Similarly, this allows the user to define multiple Places during one session, and return afterward to complete the Place details (see FIG. 13).

In some embodiments one or more Variations on a Place's Primary Action can be created and saved by the user. These variations are alternate Actions that replace the Primary Action when certain parameters are met. Multiple Variations can be created by the user through the graphical user interface and prioritized to take precedent over one another in the event that conditions are met for multiple Variations at once. This ensures that only a single Place Action will happen when entering a Place, whether Primary or one of the defined Variations.

In some embodiments Variations are created by selecting and configuring parameters that include, but are not limited to, time of day range, sunrise/sunset, day of the week, round trip status, which Journey is being executed, weather parameters, distance from the center point of a Place, and direction of entry into a Place. These conditions can be stacked or combined to create a single Variation. An example stacked Variation would be a configuration to play a victory song when the user is on their Monday morning exercise run and returns to their point of origin. The conditions selected for this Variation could be, for example, Monday between sunrise and 9:00 AM when the user returns to the starting location during a round trip.

In some embodiments Journeys are collections of previously defined Places that are also stored by the app software in the core data structure. They can be manually compiled through the graphical user interface (GUI) or built during transit by using Capture Mode or Map Mode (see FIG. 11).

Figure 12:
FIG. 12. (SS6) shows an embodiment of the tool Places in a Journey and the capability to modify the expected order of the Places.

In the manual Journey definition process, the user would assign a name to the Journey, select an icon to represent it on the main screen of the app software, and would select which Places to include in that Journey. If the Journey is to be travelled in the same sequence each time it is executed, the Places can be configured by the user in the order they are expected to be encountered. This ordering process then allows the app software to provide enhanced functionality such as predicting the time to the next Place at the current rate of travel, allowing for an audible verbal countdown or musical fanfare tracks to be overlaid on the primary content, etc. The ordering process also unlocks additional functionality that allows the user to simulate a Journey in advance of traveling by manually stepping through the included Places in proper order, and experiencing the Journey as it will occur when traveling, including programmed content playback, volume levels, and all aspects of Place transitions defined (see FIG. 12).

In some embodiments capture Mode, as previously referenced in the this disclosure, not only serves as an alternate method of defining multiple Places, it actually defines and saves a new Journey that includes those Places in the expected order of their encounter.

Figure 14:
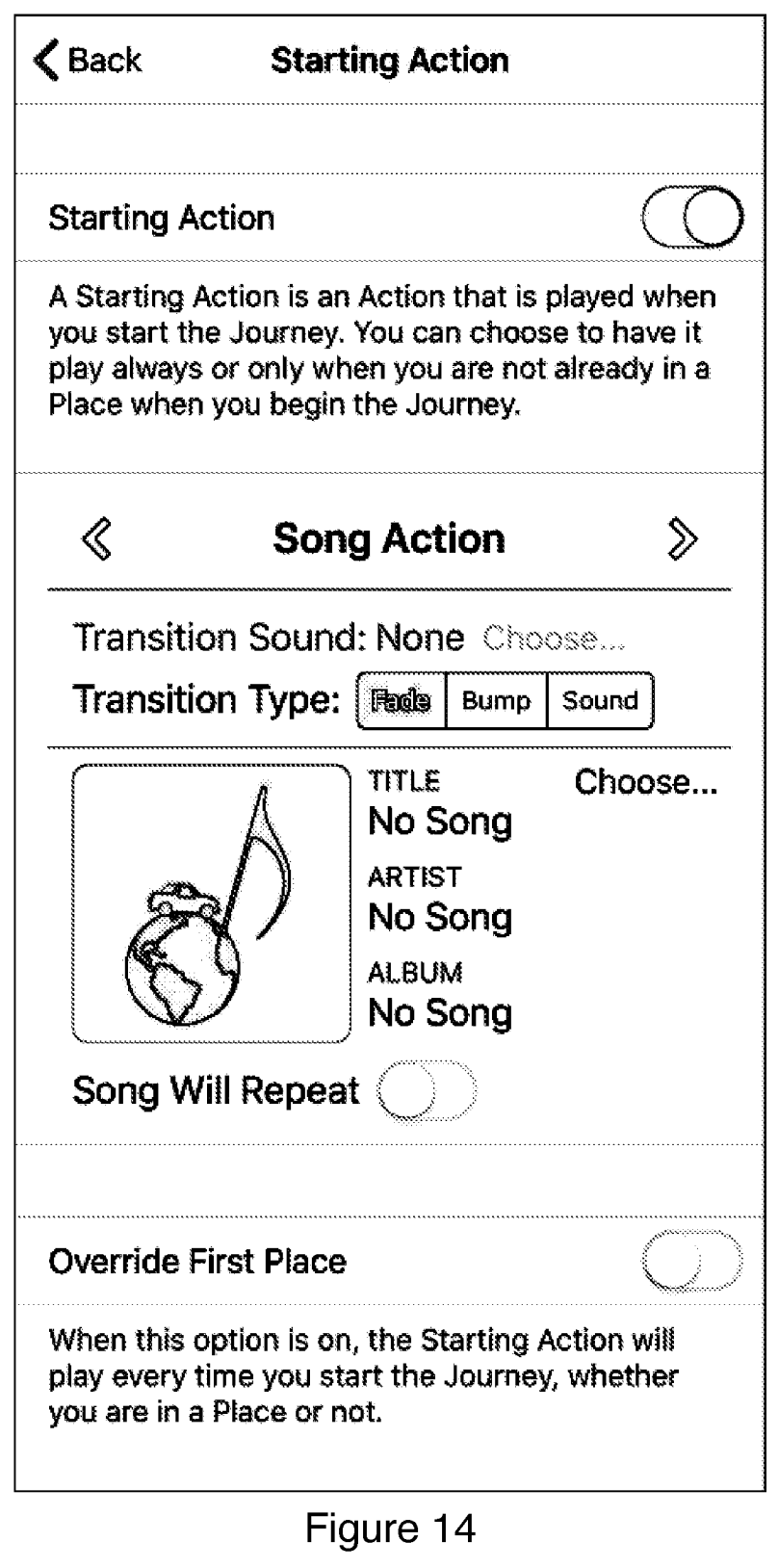

Regardless of the method used to create a Journey, the app software also presents a method to select a starting Action that can be added to perform any of the previously described Place Actions upon execution of the Journey (see FIG. 1, block 41). This allows for audio content to be played when Journey is selected, even if the user mobile device is not in a Place yet. Similarly, the app software also presents a method to select a base action that can be added to a Journey, to allow for a standard set of content to be played after completion of any content that was triggered by a Place Action. These two functions allow for content to be played at all times during Journey if desired by the user, whether a Place Action is in effect at the time or not (see FIG. 14).

In some embodiments the app software has a mechanism included to export and import Places or Journeys. This allows for sharing of individual Place or Journey data structures between users, while also allowing for data structures imported from or exported to a third party marketplace. Shared Places, Journeys, or musical content style definitions can be imported and exported as files. This enables sharing via email or through close range wireless transfer between like applications, as supported through the host operating systems (OS).

In some embodiments the app software allows licensed wireless content streaming capabilities from third party centralized content web server(s) via the internet into the user mobile device. This could be used, for example, to extend the media experience of the third party business outside its physical boundaries when a user defines that region as a Place and enters the Place. Through the embodiments previously described, the third party business could share their predefined Place, including their content URL, with the user via email or other means in advance of the user arrival. Examples for this function may include, but are not limited to, a restaurant, tourist attraction, public park, or nightclub. Advertising use can also be accommodated through this embodiment of the app.

In some embodiments the app software contains provisions through an application programming interface (API) to enable music, navigation, or other types of third party mobile device applications to license the full location-based content functionality provided by this invention, including the display of portions of the subject app's standard user interface within the third party application. In some embodiments the app software provides the ability for a user to record, edit, and save their own audio content to be programmed for playback based on location and other parameters as previously defined within this document. This functionality allows for customized vocal, musical, or sound effect content to be utilized within a Journey, in any combination with prerecorded and licensed content as well as real-time musical content generation.

Versions of the invention concept may be a computer-implemented method of providing media content through a mobile device, comprising: receiving a definition of a place, the definition comprising a name definition and a geographical definition;

determining that the mobile device is within a threshold distance from the place;

selecting media content from available media content that is available to the mobile device based on the determining, the selected media content being associated with the name definition or the geographical definition;

queuing the selected media content for playback on the device in a media queue, the media queue comprising a travel parameter; and presenting media content from the media queue through the mobile device based on the travel parameter.

Other versions of the invention concept may be the computer-implemented method above, wherein the name definition is based on user data or media data, and wherein the geographical definition comprises: a geographical boundary surrounding a geographic position defined by a user and associated with the threshold distance.

Other versions of the invention concept may be the computer-implemented above, wherein determining that the mobile device is within the threshold distance comprises receiving geolocation data for the mobile device.

Other versions of the invention concept may be the computer-implemented method above, wherein the geolocation data is Global Positioning System (GPS) data, wireless base station connectivity data, cellular base station connectivity data, or wireless beacon connectivity data.

Other versions of the invention concept may be the computer-implemented method above, wherein selecting the media content comprises: identifying a playback action associated with the name definition or the geographic definition;

searching available media content based on the playback action; and selecting the media content based on the playback action.

Other versions of the invention concept may be the computer-implemented method above, wherein the playback action comprises at least one of playback of a single piece of media content, playback of a sequence of pieces of media content, and playback of at least a portion of an external stream of media content.

Other versions of the invention concept may be the computer-implemented method above, wherein available media content that is available to the mobile device comprises media content stored on the mobile device, external streams of media content accessible to the mobile device, and artificially generated compositions of media content generated at the mobile device.

Other versions of the invention concept may be computer-implemented method above, further comprising: receiving a plurality of definitions of a plurality of places;

determining that the mobile device is within a threshold distance from at least one place of the plurality of places;

selecting media content from available media content that is available to the mobile device based on the determining; and queuing the selected media content for playback on the device in the media queue.

Other versions of the invention concept may be a computer-implemented method of automated media playback on a mobile device, comprising: receiving location preferences associated with a plurality of geographic locations, the location preferences including a textual description of the plurality of geographical locations;

determining that the mobile device is traveling towards one or more of the geographic locations; identifying media content from available media content that is available to the mobile device based on the determining, the identified media content having metadata associated with the textual description of the one or more of the geographic locations; and initializing playback of the identified media content on the mobile device.

Other versions of the invention concept may be a non-transitory computer-readable medium with instructions stored thereon that, responsive to execution by a processing device, cause the processing device to perform operations comprising: receiving a definition of a place, the definition comprising a name definition and a geographical definition; determining that the mobile device is within a threshold distance from the place; selecting media content from available media content that is available to the mobile device based on the determining, the selected media content being associated with the name definition or the geographical definition; queuing the selected media content for playback on the device in a media queue, the media queue comprising a travel parameter; and presenting media content from the media queue through the mobile device based on the travel parameter.

Other versions of the invention concept may be a system comprising: a memory with instructions stored thereon; and a processing device, coupled to the memory, the processing device configured to access the memory and execute the instructions, wherein the instructions cause the processing device to perform operations comprising: receiving a definition of a place, the definition comprising a name definition and a geographical definition; determining that the mobile device is within a threshold distance from the place; selecting media content from available media content that is available to the mobile device based on the determining, the selected media content being associated with the name definition or the geographical definition; queuing the selected media content for playback on the device in a media queue, the media queue comprising a travel parameter; and presenting media content from the media queue through the mobile device based on the travel parameter.

We claim:

1. A computer-implemented method of providing media content through a mobile device, comprising:
   determining a location condition comprising:
      receiving a definition of a place, the definition comprising a name definition and a geographical definition;

determining that the mobile device is within a threshold distance from the place;
receiving a definition of a journey, the definition comprising a collection of places;
determining whether a variation condition is met and executing a default action in case the variation condition is met, wherein the executing comprises triggering an alternate action that takes priority over the default action in case one or more variation conditions other than the location condition are met;
selecting media content as a function of the variation condition, wherein the variation condition includes identifying parameters related to a journey;
selecting media content from available media content that is available to the mobile device based on the determining that the mobile device is within the threshold distance from the place and determining that the variation condition is met, the selected media content being associated with the name definition or the geographical definition;
queuing the selected media content for playback on the device in a media queue, the media queue comprising a travel parameter; and
presenting media content from the media queue through the mobile device based on the travel parameter.

2. The computer-implemented method of claim 1, wherein the name definition is based on user data or media data, and wherein the geographical definition comprises:
a geographical boundary surrounding a geographic position defined by a user and associated with the threshold distance.

3. The computer-implemented method of claim 1, wherein determining that the mobile device is within the threshold distance comprises receiving geolocation data for the mobile device.

4. The computer-implemented method of claim 3, wherein the geolocation data is Global Positioning System (GPS) data, wireless base station connectivity data, cellular base station connectivity data, or wireless beacon connectivity data.

5. The computer-implemented method of claim 1, wherein selecting the media content comprises:
identifying a playback action associated with the name definition or the geographic definition;
searching available media content based on the playback action; and selecting the media content based on the playback action.

6. The computer-implemented method of claim 5, wherein the playback action comprises at least one of playback of a single piece of media content, playback of a sequence of pieces of media content, and playback of at least a portion of an external stream of media content.

7. The computer-implemented method of claim 1, wherein available media content that is available to the mobile device comprises media content stored on the mobile device, external streams of media content accessible to the mobile device, and artificially generated compositions of media content generated at the mobile device.

8. The computer-implemented method of claim 1, further comprising:
receiving a plurality of definitions of a plurality of places;
determining that the mobile device is within the threshold distance from at least one place of the plurality of places;
selecting media content from available media content that is available to the mobile device based on the determining; and
queuing the selected media content for playback on the device in the media queue.

9. The computer-implemented method of claim 1, wherein the variation condition includes, a weather condition parameter.

10. The computer implemented method of claim 1, wherein the variation condition includes a direction of travel of the mobile device parameter.

11. The computer implemented method of claim 1, wherein the variation condition includes a round trip status parameter.

12. The computer implemented method of claim 1, wherein the variation condition includes a day of the week parameter.

13. The computer implemented method of claim 1, wherein the variation condition includes a time of day parameter.

14. The computer implemented method of claim 1, wherein the variation condition further comprising a parameter selected from the group consisting of a weather condition parameter, a direction of travel of the mobile device parameter, a round trip status parameter, a day of the week parameter, and a time of day parameter.

15. A computer-implemented method of automated media playback on a mobile device, comprising:
determining a location condition comprising:
receiving location preferences associated with a plurality of geographic locations, the location preferences including a textual description of the plurality of geographical locations;
determining that the mobile device is traveling towards one or more of the geographic locations;
determining whether a variation condition is met and executing a default action in case the variation condition is met, wherein the executing comprises triggering an alternate action that takes priority over the default action in case one or more variation conditions other than the location condition are met;
identifying media content from available media content that is available to the mobile device based on the determining that the mobile device is traveling towards one or more of the geographic locations and that the variation condition is met, the identified media content having metadata associated with the textual description of the one or more of the geographic locations; and
initializing playback of the identified media content on the mobile device.

16. The computer-implemented method of claim 15, wherein the variation condition includes, a weather condition parameter.

17. The computer implemented method of claim 15, wherein the variation condition includes a direction of travel of the mobile device parameter.

18. The computer implemented method of claim 15, wherein the variation condition includes a round trip status parameter.

19. The computer implemented method of claim 15, wherein the variation condition includes a day of the week parameter.

20. The computer implemented method of claim 15, wherein the variation condition includes a time of day parameter.

21. The computer implemented method of claim 15, wherein the variation condition further comprising a parameter selected from the group consisting of a weather condition parameter, a direction of travel of the mobile device parameter, a round trip status parameter, a day of the week parameter, and a time of day parameter.

22. A non-transitory computer-readable medium with instructions stored thereon that, responsive to execution by a processing device, cause the processing device to perform operations comprising:
  determining a location condition comprising:
    receiving a definition of a place, the definition comprising a name definition and a geographical definition;
    determining that the processing device is within a threshold distance from the place;
    receiving a definition of a journey, the definition comprising a collection of places;
  determining whether a variation condition is met and executing a default action in case the variation condition is met, wherein the executing comprises triggering an alternate action that takes priority over the default action in case one or more variation conditions other than the location condition are met;
  selecting media content as a function of the variation condition, wherein the variation condition includes identifying parameters related to a journey;
  selecting media content from available media content that is available to the processing device based on the determining that the processing device is within the threshold distance from the place and determining that the variation condition is met, the selected media content being associated with the name definition or the geographical definition;
  queuing the selected media content for playback on the device in a media queue, the media queue comprising a travel parameter; and
  presenting media content from the media queue through the processing device based on the travel parameter.

23. The computer-implemented method of claim 22, wherein the variation condition includes, a weather condition parameter.

24. The computer implemented method of claim 22, wherein the variation condition includes a direction of travel of the processing device parameter.

25. The computer implemented method of claim 22, wherein the variation condition includes a round trip status parameter.

26. The computer implemented method of claim 22, wherein the variation condition includes a day of the week parameter.

27. The computer implemented method of claim 22, wherein the variation condition includes a time of day parameter.

28. The computer implemented method of claim 22, wherein the variation condition further comprising a parameter selected from the group consisting of a weather condition parameter, a direction of travel of the processing device parameter, a round trip status parameter, a day of the week parameter, and a time of day parameter.

29. A system comprising:
  a memory with instructions stored thereon; and
  a processing device, coupled to the memory, the processing device configured to access the memory and execute the instructions, wherein the instructions cause the processing device to perform operations comprising:
  determining a location condition comprising:
    receiving a definition of a place, the definition comprising a name definition and a geographical definition;
    determining that the processing device is within a threshold distance from the place;
    receiving a definition of a journey, the definition comprising a collection of places;
  determining whether a variation condition is met and executing a default action in case the variation condition is met, wherein the executing comprises triggering an alternate action that takes priority over the default action in case one or more variation conditions other than the location condition are met;
  selecting media content as a function of the variation condition, wherein the variation condition includes identifying parameters related to a journey;
  selecting media content from available media content that is available to the processing device based on the determining that the processing device is within the threshold distance from the place and determining that the variation condition is met, the selected media content being associated with the name definition or the geographical definition;
  queuing the selected media content for playback on the device in a media queue, the media queue comprising a travel parameter; and
  presenting media content from the media queue through the processing device based on the travel parameter.

* * * * *